July 21, 1964 W. J. McCONEGHEY 3,141,789
COATING COMPOSITION, COATED POLYOXYMETHYLENE, AND PROCESS
FOR COATING POLYOXYMETHYLENE
Filed April 14, 1961
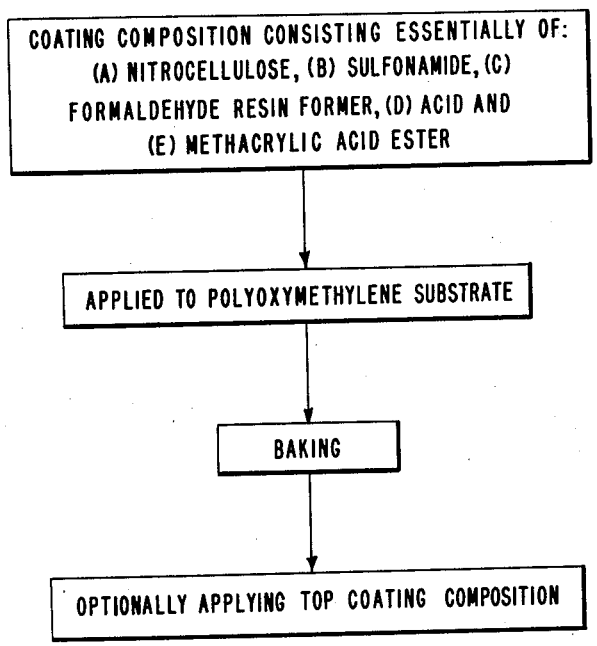
INVENTOR
WILLIAM JOSEPH MC CONEGHEY
BY Raymond E. Blomfield
ATTORNEY

3,141,789
COATING COMPOSITION, COATED POLYOXY-
METHYLENE, AND PROCESS FOR COATING
POLYOXYMETHYLENE
William Joseph McConeghey, Springfield Township, Delaware County, Pa., assignor to E. I. du Pont de Nemours and Company, Wilmington, Del., a corporation of Delaware
Filed Apr. 14, 1961, Ser. No. 102,953
7 Claims. (Cl. 117—73)

This invention relates to coating compositions and, more particularly to coating compositions for polyoxymethylene.

In recent years particular attention has been directed toward polyoxymethylenes, that is, polymers having the recurring —$CH_2O$— group such as, for example, the high molecular weight polymers shown in U.S. Patent No. 2,768,994. Such polyoxymethylenes have many outstanding properties, including among others, very high strength and toughness per unit weight, outstanding solvent resistance, ease of fabrication and simplified design in articles fabricated therewith. Such properties have made it possible, for example, to substitute polyoxymethylenes for metals in certain parts of automobiles.

For decorative, functional and economy reasons, it has become desirable to apply paints, lacquers or other coating compositions to polyoxymethylenes. Unfortunately, however, conventional top-coating compositions and primers therefor do not adhere to polyoxymethylenes. Sanding the surface of polyoxymethylenes to improve the adhesion of aforementioned conventional compositions is time consuming and expensive. Thus, heretofore the desirable properties of polyoxymethylenes have not been fully exploited.

This invention provides unique coating compositions characterized by a low baking temperature and outstanding adhesion both to polyoxymethylenes and to conventional top-coating compositions.

The drawing shows a flow diagram of a preferred process of the invention.

The unique coating compositions of this invention comprise (A) nitrocellulose and, for each part thereof, (B) about from 0.2 to 5, and preferably 1 to 3 parts by weight of sulfonamide, (C) about from 0.05 to 1, and preferably 0.3 to 0.75 part by weight of a formaldehyde resin former and (D) about from 0.02 to 0.2, and preferably 0.04 to 0.1 milliequivalent of strong, nonvolatile acid. Preferably, the compositions of this invention contain up to 4, and preferably 1 to 2 parts, per part of nitrocellulose, of polymer of at least one ester of methacrylic acid with a 2- to 22-carbon atom alcohol.

The term "polyoxymethylene" as used herein refers to homopolymers containing substantially all oxymethylene chain units (exclusive of terminal groups) as well as co-polymers containing a major proportion, usually 90% or more by weight, of oxymethylene units and a minor portion of residues derived, for example, from alkylene oxides such as ethylene oxide, vinyl compounds such as vinyl ethers and certain vinyl nitrogen compounds, polyalkyleneether glycols and other comonomers. "Milliequivalent" as used herein refers to that amount of acid which contains $\frac{1}{1000}$ part by weight of acidic hydrogen.

The nitrocellulose used in the coating compositions of this invention can be any of the wide variety of the grades commonly employed in coating compositions. The most common characteristic used to define the nitrocellulose is viscosity which can be measured as a 12.2% solution in the solvent mixture defined in Formula A in A.S.T.M. D–301–54T. Examples of types of nitrocellulose which can be used in the compositions of this invention are lacquer grades, for example, those having viscosities of from ¼ to 5 seconds, and preferably about ½ second; dope-grades having viscosities as high as 50 or 100 seconds and even grades having viscosities substantially higher than those just mentioned, particularly where such viscous grades are blended with the lower viscosity grades of nitrocellulose.

The second essential constituent of the compositions of this invention is at least one sulfonamide. Examples of sulfonamides are o- and p-toluenesulfonamide, N-methyl o- and p-toluenesulfonamide, N-ethyl o- and p-toluenesulfonamide, N-propyl o- and p-toluenesulfonamide, N-cyclohexyl o- and p-toluenesulfonamide, benzenesulfonamide, N-ethyl benzenesulfonamide, 1-naphthylenesulfonamide, 1-propanesulfonamide, 2-pentanesulfonamide, 2-furanmethanesulfonamide, and 2,4-dimethyl benzenesulfonamide. Aryl (including substituted aryl such as alkaryl) sulfonamides, especially aryl sulfonamides derived from aryl sulfonic acids and ammonia or primary amines are preferred. Sulfonamides of aryl sulfonic acids and primary amines of 1 to 6 carbon atoms such as the N-ethyl toluenesulfonamides are particularly preferred because of their rapid reactivity and because they give products and compositions which can be baked to have an outstanding combination of adhesion and flexibility. If desired, polymeric sulfonamides, for example, resinous condensation products of the aforementioned sulfonamides and formaldehyde, can be used in whole or in part for the aforementioned monomeric sulfonamides.

The coating compositions of this invention contain a strong, nonvolatile acid, that is, an acid with a dissociation constant in water of greater than about $1 \times 10^{-3}$ having a boiling point above about the baking temperature of the composition, for example, above about 200 and preferably 250° F. Such acids are, for example, free-acid cognates of many of the aforementioned sulfonamides such as benzenesulfonic acid, o- and p-toluenesulfonic acids, 1-naphthalenesulfonic acid and 1,5-naphthalenedisulfonic acid; other sulfur acids such as sulfuric acid, thiosulfuric acid and sulfurous acid; phosphoric acids such as orthophosphoric acid and pyrophosphoric acid, other miscellaneous organic and inorganic acids such as picric acid, toluic acid, chromic acid and iodic acid; and mixtures thereof. Preferably, the aforementioned acids are soluble in the resin-solvent mixture used in the compositions of this invention. Aryl sulfonic acids, especially toluene sulfonic acids are particularly preferred. In calculating the equivalent amount of any acid, only that acidic hydrogen the dissociation of which corresponds to a dissociation constant in water of greater than about $10^{-3}$ is considered; thus, a milliequivalent of sulfuric acid is 0.049 gram, pound, etc., while a milliequivalent of sulfurous acid is 0.082 unit weight.

As noted hereinbefore, the coating compositions of this invention contain a formaldehyde resin former. Such materials can include any of the wide variety of materials conventionally condensed with formaldehyde to produce amino- and phenol-formaldehyde resins. Examples of such materials are phenols such as phenol per se, o-, m- and p-cresol, thymol, hydroquinone, resorcinol, pyrogallol, chloroglucinol, pyrocatechol and cashew nut oil; ureas such as urea per se and substituted ureas; the aminotriazines and diazines such as melamine; and mixtures thereof. Resorcinol is particularly preferred because it yields products having an optimum balance of properties characteristic of the compositions of this invention including, particularly, a low baking temperature.

The aforementioned acids together with the formaldehyde resin formers allow baking and curing of compositions of this invention at relatively low temperatures. Low baking temperatures not only are desirable in reducing baking costs and simplifying baking equipment, but, in addition, they reduce undesirable shrinkage of the polyoxymethylene substrates during baking. By the use of the aforementioned combination of acid and formaldehyde resin former, the baking temperature of the unique compositions of this invention may be lowered as much as 50° F. or more and thus shrinkage allowance in molds for the fabrication of polyoxymethylene can be reduced or eliminated. The combination of acid and formaldehyde resin former also results in a wide baking range of the subject compositions and superior resistance to blistering of baked acrylic topcoats, for example, methyl methacrylate lacquers, applied thereover.

The compositions of this invention preferably contain a compatible polymer of at least one ester of methacrylic acid with a 2 to 22 carbon-atom alcohol, preferably an alkanol. Examples of such polymers are conventional lacquer-grade polymers of ethyl methacrylate, n-propyl methacrylate, n-butyl methacrylate, isobutyl methacrylate, 2-ethyl hexyl methacrylate, decyl methacrylate, lauryl methacrylate, palmityl methacrylate, stearyl methacrylate, 10-methyl-10-decenyl methacrylate, methoxyethyl methacrylate, ethoxyethyl methacrylate, butoxyethyl methacrylate and hydroxyethyl methacrylate. Also, copolymers of two or more of the aforementioned esters or of one or more of the aforementioned esters and at least one other acrylic ester, for example, copolymers of hydroxyethyl methacrylate and cyclohexyl methacrylate or one or more of the aforementioned methacrylate esters and up to 30% of an acrylate, for example, an ester of acrylic acid and a $C_2$ to $C_6$ alkanol can be used. Generally, the amount of modifier required for a given level of performance decreases as the molecular weight of the ester therein increases. Polymers of butyl methacrylate, and particularly those containing 70% or more of n-butyl methacrylate are preferred methacrylate modifiers used in the compositions of this invention. In the compositions of this invention, the methacrylate modifiers greatly improve flexibility. Also, to some extent, the methacrylate ester polymers improve the adhesion of conventional coating compositions to prime coatings of the compositions of this invention.

If the methacrylate polymer modifiers are eliminated from the compositions of this invention or a small portion thereof is employed, it is preferred to increase the proportion of sulfonamide or to incorporate conventional plasticizers or other flexibilizing materials in the compositions used herein. Plasticizers which can be used include, for example, dibutyl phthalate, benzyl butyl phthalate, sucrose acetate isobutyrate, di(2-ethylhexyl) phthalate, di(2-ethylhexyl) azelate, butyl cyclohexyl phthalate, 2-ethylhexyl benzyl phthalate, di(cyclohexyl) phthalate and mixtures thereof. Other film-forming materials which also can be incorporated in the compositions applied to polyoxymethylene substrates according to this invention, for example, in amounts up to 25% or even more based on the weight of film-forming materials, are, for example, alkyd resins, particularly the non-drying oil modified alkyd resins; natural oils such as castor oil; polymers of itaconate diesters, for example, copolymers of $C_2$ to $C_{12}$ alkanol diesters of itaconic acid and methyl methacrylate; cellulose esters such as cellulose acetate butyrate and cellulose acetate propionate; and mixtures thereof.

Standard pigments, which are inert toward the other ingredients, particularly those pigments which do not react with formaldehyde or the formaldehyde resin formers, can be used in conventional amounts to color and fill the coating compositions employed in this invention. Such pigments are, for example, titanium dioxide, carbon black, magnesium silicate, monastral blue, monastral green, molybdate orange, barium sulfate, silica and mixtures thereof. Conventional lacquer solvents, particularly esters, ethers, ketones, alcohols and aromatic hydrocarbons also can be used in conventional amounts in the compositions used in this invention. Such solvents are, for example, ethyl acetate, butyl acetate, dibutyl ether, acetone, methyl isobutyl ketone, butanol, isopropanol, benzene, toluene, xylene and mixtures thereof. Compositions of about 10 to 50%, and preferably 20 to 30% of solids are usually employed.

Compositions of this invention can be prepared by conventional formulating techniques. Normally, any pigments used are first ground on conventional grinding equipment with part of the nitrocellulose and, if desired, part of any plasticizer employed until a smooth uniform dispersion or mill base is obtained, then the resulting mill base is blended with a solution of the remainder of the constituents of the compositions.

The compositions of this invention can be applied by any of the conventional coating techniques. Normally, primers of this invention are applied at a thickness sufficient to give a dry film of about from 0.5 to 1 mil thick. Usually, thicker films dry somewhat more slowly and may remain tacky. Dry film thicknesses substantially below 0.5 mil may lead to somewhat less adhesion to the substrate.

In contrast to conventional coating compositions containing nitrocellulose, the compositions of this invention must be baked to develop their desirable properties. Preferably, they are allowed to dry for a short time at room temperature, then baked for about from 10 to 60 minutes, and preferably 15 to 45 minutes at temperatures on the order of 200 to 325° F., and preferably 225 to 275° F. Lower temperatures are used with longer baking times.

Any of a wide variety of top-coating compositions can be applied over the products of this invention comprising a polyoxymethylene substrate having an adherent coating of the subject compositions. Such top-coating compositions are, for example, those of conventional alkyl resins formed from polycarboxylic acids such as phthalic acid, adipic acid, maleic acid and sebacic acid, polyols such as glycerol, pentaerythritol and ethylene glycol and oil components such as castor oil, tung oil, linseed oil, soyabean oil, coconut oil and hydrogenated castor oil; phenol- and amino-aldehyde resins such as those formed by condensing formaldehyde, acetaldehyde, benzaldehyde or furfural with one or more of the aformentioned formaldehyde resin formers, including methylol melamines and methylol ureas; mixtures of the aforementioned alkyl resins and amino- and phenol-aldehyde resins; acrylic polymers, for example, containing 50 and usually 75% or more of methyl methacrylate; cellulose esters such as nitrocellulose cellulose acetate butyrate, cellulose acetate propionate, cellulose butyrate or cellullose propionate; vinyl resins such as those of vinyl acetate alone or copolymerized with vinyl chloride; polyvinyl butyral; epoxy resins; and mixtures thereof. Such top-coating compositions can be applied by standard procedures employed in the art; preferably, however, such coating compositions should not be cured substantially above the temperature at which the prime coating compositions are cured.

The products of this invention comprising a polyoxymethylene substrate and a baked coating of the compositions of this invention are useful per se; however, preferably the products comprise a coating of a composition of this invention and one or more coats of the aforementioned conventional top-coating compositions.

The products of this invention are characterized by excellent interlayer and coating-to-substrate adhesion. A wide spectrum of conventional coating compositions can be used as top coats in products of this invention. Since the preparation of the products of this invention does not degrade the polyoxymethylene substrates, the subject invention provides an efficient and economical method for more fully exploiting the novel and outstanding properties of polyoxymethylenes.

The unique coating compositions of this invention require relatively low baking temperatures; hence, yield products with reduced shrinkage. In addition, dried coatings of these unique compositions are remarkably insensitive variations in coating thickness, substrate thickness and baking temperature.

The coating compositions of this invention can be applied to a wide variety of articles of polyoxymethylene such as automobile instrument clusters, interior and exterior automotive hardware and trim, staple removers, dials for instruments and appliances, business machine parts, hair and tooth brushes and any of a wide variety of molded or otherwise fabricated articles to yield products of this invention.

In the following examples which illustrate this invention, parts and percentages are by weight unless otherwise indicated.

EXAMPLE 1

Preparation of Coating Composition

A mill base is prepared by grinding together about an equal-weight mixture of dope-grade nitrocellulose wet with isopropanol, titanium dioxide pigment and a mixture of 53% soya-oil modified alkyd resin, castor oil and dibutyl phthalate until a uniform dispersion is obtained, then dissolving the resulting product in about an equal weight of a solvent mixture of amyl acetate and xylene. A second mill base is prepared by a similar procedure except that a small portion of carbon black pigment is substituted for the titanium dioxide pigment. The resulting mill bases are then thoroughly blended with a solution of more dope-grade nitrocellulose, poly(n-butyl methacrylate), a 20% solution in isopropanol of resorcinol, a mixture of the ortho and para isomers of N-ethyl toluene sulfonamide and p-toluene sulfonic acid all in a substantially equal-weight mixture of xylene and amyl acetate to yield a coating composition having the following overall formulation:

| | Parts |
|---|---|
| Nitrocellulose (about 22 second viscosity determined as described hereinbefore) | 100.0 |
| N-ethyl toluene sulfonamide mixture | 192.0 |
| Poly(n-butyl methacrylate) | 150.0 |
| Resorcinol | 53.1 |
| p-Toluene sulfonic acid (about 5 milliequivalents) | 1.0 |
| Alkyd resin | 47.8 |
| Dibutyl phthalate | 9.0 |
| Castor oil | 8.2 |
| Titanium dioxide | 61.9 |
| Carbon black | 1.4 |
| Solvent | 820.0 |

Preparation of Coated Article

The composition above is diluted to about 15 to 20% solids with a conventional lacquer thinner, then sprayed onto a sheet of polyoxymethylene (M.W. greater than 20,000 and of substantially all oxymethylene chain units). Next, the wet coating is dried for about 10 to 15 minutes at room temperature, then baked for 30 minutes at 250° F. to yield a baked coating about 0.7 mil thick. Two samples of the prime-coated polyoxymethylene are next top coated with a conventional polymethyl methacrylate lacquer and a conventional soya-oil modified alkyd/melamine-formaldehyde resin enamel, respectively, and baked for 30 minutes at 225° F. and 20 minutes at 250° F., respectively.

Evaluation of Product

Adhesion is tested by scribing intersecting sets of parallel lines about ⅛-inch apart through the multi-layered coatings on the above panels down to the polyoxymethylene with a knife blade. Next, a piece of cellophane adhesive tape is firmly applied over the cross-hatched area. Finally, the tape is removed with a jerk. In the above tape test, no paint is removed with the cellophane tape indicating excellent top coat-to-primer and primer-to-substrate adhesion. If the above procedure is repeated except that the top coats are coated directly onto the polyoxymethylene, or conventional primers for the aforementioned top coats are coated onto the polyoxymethylene and the top coats are applied thereover, the entire coating is removed in the tape test just mentioned.

A thin section of polyoxymethylene is prime coated with the composition of this invention and top coated as described above, then flexed 45 or more degrees repeatedly in either direction. In this flex test, the above coating system does not evidence any coating failure. The coated articles of this invention described above also have an excellent combination of high temperature and high humidity resistance and resistance to cracking on rapid change in temperature and humidity. Because of the relatively low baking temperature required for both the primer and the top coats, there is only minor shrinkage of the polyoxymethylene substrate in the above articles during coating.

If the procedure described above is repeated except that an equal weight of phenol is substituted for the resorcinol used in the composition of this invention above, products with similar excellent interlayer and coating-to-substrate adhesion are obtained; however, a primer baking temperature of 10 to 15° F. higher is usually preferred to develop full adhesion and film properties.

Substantially similar results are obtained in this and the following examples if a substrate of a polyoxymethylene containing a few percent of ethylene oxide, —OCH$_2$CH$_2$—, units is substituted for the substrate above of a polyoxymethylene having solely oxymethylene units except for terminal units.

EXAMPLE 2

A coating composition is prepared by the procedure and from the materials and in the amounts specified in Example 1 except that an equal weight of lacquer-grade nitrocellulose having a viscosity between ¼ and ½ second is substituted for the dope-grade nitrocellulose used in that example. The resulting composition can be diluted and sprayed at about 30% solids and thus has the advantage of fast application.

Polyoxymethylene substrates primed with the above composition of this invention and top coated as described in Example 1 have properties similar to the corresponding products of that example and are characterized, inter alia, by excellent interlayer and coating-to-substrate adhesion and minimal shrinkage.

If a copolymer of 55% of ethyl methacrylate and 45% of n-hexyl methacrylate is substituted for the homopolymer of n-butyl methacrylate used in the above composition of this invention, similar results are obtained.

EXAMPLE 3

A coating composition is prepared from the materials, in the amounts and by the procedure described in Example 1 except that 1.6 parts (16.5 milliequivalents) of orthophosphoric acid are substituted for the 1.0 part of p-toluene sulfonic acid used in that example. The resulting composition is diluted to spraying viscosity, coated onto a polyoxymethylene substrate, air dried for 10 to 15 minutes, then baked for 30 minutes at 250° F. to yield a baked coating about 0.7 mil thick. Finally, a top coat of conventional nitrocellulose lacquer is applied thereover and air dried at room temperature to yield a product of this invention. The resulting product has excellent interlayer and coating-to-substrate adhesion, shows a minimal substrate shrinkage and otherwise has properties similar to the product of Example 1.

EXAMPLE 4

A coating composition of this invention is prepared by the general procedure described in Example 1 from the following materials:

| | Parts |
|---|---|
| Nitrocellulose (same as Example 1) | 100.0 |
| p-Toluene sulfonamide | 98.2 |
| Resorcinol | 54.9 |
| p-Toluene sulfonic acid | 1.0 |
| Poly(n-butyl methacrylate) | 146.8 |
| Soya-oil alkyd resin | 48.3 |
| Blown castor oil | 8.4 |
| Dioctyl phthalate | 8.6 |
| Titanium dioxide pigment | 61.9 |
| Carbon black pigment | 1.6 |
| Solvent (similar to that in Example 1) | 850 |

The resulting composition is thinned to about 15 to 20% solids and sprayed onto a sheet of polyoxymethylene, then baked 30 minutes at 250° F. to yield a baked coating about 0.7 mil thick which has excellent adhesion to the substrate and excellent flex resistance. A conventional polymethyl methacrylate lacquer is applied at a 2-mil dry film thickness to the aforementioned primed and coated panel, then baked at 30 minutes at 225° F. The resulting product also has excellent adhesion and flex resistance.

Similar results are obtained if an equal weight of benzene or 1-naphthalene sulfonamide is substituted for the p-toluene sulfonamide used in the composition of this invention above. In a like manner, an equivalent weight of benzene or 1-naphthalene sulfonic acid can be substituted for the p-toluene sulfonic acid used in the above composition of this invention.

EXAMPLE 5

A coating composition is prepared by the general procedure described in Example 1 from the following materials:

| | Parts |
|---|---|
| Nitrocellulose (same as Example 1) | 100 |
| N-ethyl toluenesulfonamide (mixture of ortho and para isomers) | 200 |
| Resorcinol | 50 |
| p-Toluene sulfonic acid | 0.5 |
| Soya-oil alkyd resin | 100 |
| Copolymer of 85% vinyl chloride, 12% vinyl acetate and 3% vinyl alcohol ("Vinylite" VAGH) | 50 |
| Titanium dioxide pigment | 70 |
| Carbon black pigment | 1.5 |

The above composition is thinned to about 15 to 20% solids and sprayed onto a sheet of polyoxymethylene, air dried for 10 minutes, then baked 30 minutes at 250° F. to yield a baked coating about 0.7 mil thick. The resulting product has good coating adhesion and flex resistance. The product can be top coated with top coating compositions such as those previously described to yield products with good interlayer and coating-to-substrate adhesion.

I claim:

1. A coating composition which comprises (A) nitrocellulose and, for each part thereof, (B) about from 0.2 to 5 parts by weight of sulfonamide, (C) about from 0.05 to 1 part by weight of a compound of the group consisting of phenols, ureas, amino triazines and diazines, (D) about from 0.02 to 0.2 milliequivalent of strong, nonvolatile acid having a dissociation constant in water of greater than about $1 \times 10^{-3}$ and having a boiling range about the baking temperature of said composition and (E) up to about 4 parts by weight of at least one ester of methacrylic acid and a 2 to 22 carbon atom alcohol.

2. An article which comprises a substrate of polyoxymethylene and, in adherent contact therewith, a baked coating of a composition of claim 1.

3. A process for improving the adhesion of coating compositions to a substrate of polyoxymethylene which comprises applying to said substrate a prime coat of the composition of claim 1, baking said prime coat and applying thereover a top coating composition containing a synthetic resin.

4. A coating composition which comprises (A) nitrocellulose and, for each part thereof, (B) about from 1 to 3 parts by weight of sulfonamide, (C) about from 0.3 to 0.75 part by weight of a compound of the group consisting of phenols, ureas, amino triazines and diazines, (D) about from 0.04 to 0.1 milliequivalent of strong, nonvolatile acid having a dissociation constant in water of greater than about $1 \times 10^{-3}$ and having a boiling range above the baking temperature of said composition and (E) about 1 to 4 parts by weight of at least one ester of methacrylic acid and a 2 to 22 carbon atom alcohol.

5. An article which comprises a substrate of polyoxymethylene and, in adherent contact therewith, a baked coating of the composition of claim 4.

6. A coating composition which comprises (A) nitrocellulose and, for each part thereof, (B) about from 1 to 3 parts by weight of aryl sulfonamide, (C) about from 0.3 to 0.75 part by weight of resorcinol, (D) about from 0.04 to 0.1 milliequivalent of aryl sulfonic acid having a dissociation constant in water of greater than about $1 \times 10^{-3}$ and having a boiling range above the baking temperature of said composition and (E) about from 1 to 2 parts by weight of a polymer of n-butyl methacrylate.

7. An article which comprises a substrate of polyoxymethylene and, in adherent contact therewith, a baked coating of the composition of claim 6.

References Cited in the file of this patent

UNITED STATES PATENTS

| | | |
|---|---|---|
| 1,995,015 | Seymour | Mar. 19, 1935 |
| 2,256,444 | Rosenblum | Sept. 16, 1941 |
| 2,537,019 | Barrett | Jan. 9, 1951 |
| 2,768,994 | MacDonald | Oct. 30, 1956 |
| 2,955,958 | Brown | Oct. 11, 1960 |
| 3,021,229 | Morgan | Feb. 13, 1962 |
| 3,034,997 | Dunne et al. | May 15, 1962 |